US012794594B2

(12) United States Patent
Pocovi et al.

(10) Patent No.: US 12,794,594 B2
(45) Date of Patent: Nov. 10, 2026

(54) APPARATUS AND METHOD FOR COMMUNICATION

(71) Applicant: Nokia Technologies Oy, Espoo (FI)

(72) Inventors: Guillermo Pocovi, Aalborg (DK); Ping-Heng Kuo, Cambridge (GB); Kalle Petteri Kela, Espoo (FI); Renato Barbosa Abreu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 298 days.

(21) Appl. No.: 18/291,508

(22) PCT Filed: Aug. 5, 2021

(86) PCT No.: PCT/EP2021/071837
§ 371 (c)(1),
(2) Date: Jan. 23, 2024

(87) PCT Pub. No.: WO2023/011718
PCT Pub. Date: Feb. 9, 2023

(65) Prior Publication Data

US 2025/0096946 A1 Mar. 20, 2025

(51) Int. Cl.
*H04L 1/1812* (2023.01)
*H04L 1/1867* (2023.01)

(52) U.S. Cl.
CPC .......... *H04L 1/1812* (2013.01); *H04L 1/1887* (2013.01)

(58) Field of Classification Search
CPC ... H04L 1/1812; H04L 1/1887; H04L 1/1822; H04L 1/189
See application file for complete search history.

(56) References Cited

U.S. PATENT DOCUMENTS

2016/0164643 A1* 6/2016 Loehr .................... H04L 1/189 370/336
2016/0278048 A1* 9/2016 Nory .................... H04L 1/1812
(Continued)

FOREIGN PATENT DOCUMENTS

EP 3846562 A1 7/2021
WO 2020/167231 A1 8/2020

OTHER PUBLICATIONS

Office action received for corresponding European Patent Application No. 21755473.2, dated Apr. 11, 2025, 5 pages.
(Continued)

*Primary Examiner* — Khoa Huynh
(74) *Attorney, Agent, or Firm* — McCarter & English LLP

(57) ABSTRACT

An apparatus and a method in a terminal device, the method comprising: receiving (402) a retransmission grant for a data packet for a Hybrid Automatic Repeat request process; based on at least one configuration parameter, determining (404) whether a condition for the Hybrid Automatic Repeat request process is met; and in accordance with a determination that the condition is met, skipping the retransmission of the data packet indicated in the retransmission grant. An apparatus and a method in a network device, the method comprising: configuring at least one configuration parameter for a Hybrid Automatic Repeat request process; and sending (704) the at least one configuration parameter to at least one terminal device (304), wherein the at least one configuration parameter indicates the at least one terminal device a condition under which the at least one terminal device (304) skips at least one retransmission of a data packet in the Hybrid Automatic Repeat request process.

18 Claims, 13 Drawing Sheets

(56) References Cited

U.S. PATENT DOCUMENTS

| | | | | |
|---|---|---|---|---|
| 2020/0236579 | A1 | 7/2020 | Cho et al. | |
| 2020/0274654 | A1 | 8/2020 | Loehr et al. | |
| 2020/0351037 | A1 | 11/2020 | Lee et al. | |
| 2021/0344452 | A1* | 11/2021 | Liu | H04W 72/23 |
| 2023/0319829 | A1* | 10/2023 | Liu | H04L 1/1896 370/329 |

OTHER PUBLICATIONS

"Adaptive retransmission with empty HARQ buffer", 3GPP TSG-RAN WG2 Meeting #96, R2-168373, LG Electronics Inc., Agenda Item: 8.8, Nov. 14-18, 2016, pp. 1-2.

"3rd Generation Partnership Project, Technical Specification Group Radio Access Network; NR; Medium Access Control (MAC) protocol specification (Release 16)", 3GPP TS 38.321, V16.5.0, Jun. 2021, pp. 1-157.

"3rd Generation Partnership Project; Technical Specification Group Services and System Aspects; Service requirements for cyber-physical control applications in vertical domains; Stage 1 (Release 18)", 3GPP TS 22.104, V18.1.0, Jun. 2021, pp. 1-81.

"3rd Generation Partnership Project; Technical Specification Group Radio Access Network; NR; Multiplexing and channel coding (Release 16)", 3GPP TS 38.212, V16.6.0, Jun. 2021, pp. 1-153.

"3rd Generation Partnership Project; Technical Specification Group Radio Access Network; NR; Physical layer procedures for data (Release 16)", 3GPP TS 38.214, V16.6.0, Jun. 2021, pp. 1-172.

"Comparison of the solutions for Survival Time", 3GPP TSG-RAN WG2 Meeting #114-e, R2-2104900, Agenda: 8.5.4, CATT, May 19-27, 2021, 5 pages.

"RAN Enhancements to Support New QoS", 3GPP TSG-RAN WG2 Meeting #114e, R2-2104903, Agenda: 8.5.4, Qualcomm Incorporated, May 19-27, 2021, pp. 1-6.

"Discussion on the mechanism to guarantee the survival time", 3GPP TSG-RAN WG2 Meeting #114 electronic, R2-2105457, Agenda: 8.5.4, Lenovo, May 19-27, 2021, pp. 1-5.

"Entering and operating in the Survival Time state", 3GPP TSG-RAN WG2 #114-e, R2-2105638, Agenda: 8.5.4, Samsung, May 19-27, 2021, 5 pages.

"Discussion on the RAN support for new QoS parameters", 3GPP TSG-RAN WG2 # 114 electronic, R2-2106227, Agenda: 8.5.4, CMCC, May 19-27, 2021, 3 pages.

"Summary of Email Discussion 506—R17 IIOT QoS", 3GPP TSG-RAN WG2 Meeting #114, R2-2104897, Agenda: 8.5.4, CATT, May 19-27, 2021, 45 pages.

Le et al., "An Overview of Physical Layer Design for Ultra-Reliable Low-Latency Communications in 3GPP Releases 15, 16, and 17", IEEE Access, vol. 09, 2021, pp. 433-444.

International Search Report and Written Opinion received for corresponding Patent Cooperation Treaty Application No. PCT/EP2021/071837, dated Apr. 7, 2022, 12 pages.

"SUL and AUL priority", 3GPP TSG-RAN WG2 Meeting #101bis, R2-1807513, Agenda: 9.12.2, Intel Corporation, May 21-25, 2018, 4 pages.

"Left issue on HARQ flushing operation for CG", 3GPP TSG-RAN WG2 #113-e, R2-2100117, Agenda: 6.4.2, OPPO, Jan. 2021, 2 pages.

* cited by examiner

APPARATUS AND METHOD FOR COMMUNICATION

RELATED APPLICATION

This application claims priority to PCT Patent Application No. PCT/EP2021/071837, filed Aug. 5, 2021, and entitled "Apparatus and method for communication", which is incorporated herein by reference in its entirety.

FIELD OF THE DISCLOSURE

Various example embodiments relate to apparatuses and a methods for communication.

Further embodiments relate to methods of operating related to such apparatus.

BACKGROUND

Wireless communications systems may e.g. be used for wireless exchange of information between two or more entities, e.g. comprising one or more terminal devices, e.g. user equipment, and one or more network devices such as e.g. base stations.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some embodiments relate to a method in a terminal device that comprises receiving a retransmission grant for a data packet for a Hybrid Automatic Repeat request process; based on at least one configuration parameter, determining whether a condition for the Hybrid Automatic Repeat request process is met; and in accordance with a determination that the condition is met, skipping the retransmission of the data packet indicated in the retransmission grant.

In some embodiments, the method may further comprise receiving at the terminal device, the at least one configuration parameter for the condition and configuring the condition according to the at least one configuration parameter.

In some embodiments, the method may further comprise changing at least one transmission configuration of a Data Radio Bearer for transmission of at least one subsequent data packet.

In some embodiments, the method may further comprise determining that the condition for the Hybrid Automatic Repeat request process is met, when a timer is expired or not running.

In some embodiments, the method may further comprise determining a duration of the timer based on the at least one configuration parameter.

In some embodiments, the method may further comprise starting the timer at a moment of a first transmission of the data packet performed in the Hybrid Automatic Repeat request process or a first transmission opportunity allocated for transmitting the data packet in the Hybrid Automatic Repeat request process.

In some embodiments, the method may further comprise determining a number of retransmission grants for retransmitting the data packet or retransmissions of the data packet performed in the Hybrid Automatic Repeat request process, and determining whether the condition is met, depending on a comparison of the number to a reference.

In some embodiments, the method may further comprise determining the reference depending on the at least one configuration parameter.

In some embodiments, the method may further comprise determining the number accounting for or disregarding retransmissions of the data packet that are performed by the terminal device autonomously for the Hybrid Automatic Repeat request process.

In some embodiments, the method may further comprise determining a time between a reception of an initial uplink transmission grant for transmitting the data packet and a reception of the retransmission grant for retransmitting the data packet in the Hybrid Automatic Repeat request process, and determining whether the condition for the Hybrid Automatic Repeat request process is met, depending on a comparison of the time to a reference.

In some embodiments, the condition is relating to at least one content of a data unit stored in the Hybrid Automatic Repeat request process.

In some embodiments, the method may further comprise determining, depending on the configuration parameter, not to change the at least one transmission configuration of the Data Radio Bearer for the transmission of the at least one subsequent data packet if the retransmission of the data packet indicated in the retransmission grant is performed or to be performed.

In some embodiments the retransmission grant is a dynamic scheduled retransmission grant or a configured grant autonomous transmission or a configured grant autonomous retransmission.

Some embodiments relate to a method in a network device, that comprises configuring at least one configuration parameter for a Hybrid Automatic Repeat request process; and sending the at least one configuration parameter to at least one terminal device, wherein the at least one configuration parameter indicates the at least one terminal device a condition under which the at least one terminal device skips at least one retransmission of a data packet in the Hybrid Automatic Repeat request process.

In some embodiments, the at least one configuration parameter indicates the at least one terminal device a condition under which the at least one terminal device changes at least one transmission configuration of a Data Radio Bearer for transmission of at least one subsequent data packet.

In some embodiments, the at least one configuration parameter indicates the at least one terminal device not to change the at least one transmission configuration of the Data Radio Bearer for the transmission of the at least one subsequent data packet if the retransmission of the data packet indicated in the retransmission grant is performed or to be performed.

Some embodiments relate to a first apparatus, comprising at least one processor, and at least one memory storing instructions, the at least one memory and the instructions configured to, with the at least one processor, cause a terminal device to receive a retransmission grant for a data packet for a Hybrid Automatic Repeat request process; based on at least one configuration parameter, to determine whether a condition for the Hybrid Automatic Repeat request process is met; and in accordance with a determination that the condition is met, to skip the retransmission of the data packet indicated in the retransmission grant.

In some embodiments of the first apparatus the at least one memory and the instructions are configured to, with the at least one processor, further cause the terminal device to receive at the terminal device, the at least one configuration parameter for the condition and to configure the condition according to the at least one configuration parameter.

In some embodiments of the first apparatus the at least one memory and the instructions are configured to, with the at least one processor, further cause the terminal device to change at least one transmission configuration of a Data Radio Bearer for transmission of at least one subsequent data packet.

In some embodiments of the first apparatus the at least one memory and the instructions are configured to, with the at least one processor, further cause the terminal device to determine that the condition for the Hybrid Automatic Repeat request process is met, when a timer is expired or not running.

In some embodiments of the first apparatus the at least one memory and the instructions are configured to, with the at least one processor, further cause the terminal device to determine a duration of the timer based on the at least one configuration parameter.

In some embodiments of the first apparatus the at least one memory and the instructions are configured to, with the at least one processor, further cause the terminal device to start the timer at a moment of a first transmission of the data packet performed in the Hybrid Automatic Repeat request process or a first transmission opportunity allocated for transmitting the data packet in the Hybrid Automatic Repeat request process.

In some embodiments of the first apparatus the at least one memory and the instructions are configured to, with the at least one processor, further cause the terminal device to determine a number of retransmission grants for retransmitting the data packet or retransmissions of the data packet performed in the Hybrid Automatic Repeat request process, and determine whether the condition is met, depending on a comparison of the number to a reference.

In some embodiments of the first apparatus the at least one memory and the instructions are configured to, with the at least one processor, further cause the terminal device to determine the reference depending on the at least one configuration parameter.

In some embodiments of the first apparatus the at least one memory and the instructions are configured to, with the at least one processor, further cause the terminal device to determine the number accounting for or disregarding retransmissions of the data packet that are performed by the terminal device autonomously for the Hybrid Automatic Repeat request process.

In some embodiments of the first apparatus the at least one memory and the instructions are configured to, with the at least one processor, further cause the terminal device to determine a time between a reception of an initial uplink transmission grant for transmitting the data packet and a reception of the retransmission grant for retransmitting the data packet in the Hybrid Automatic Repeat request process, and determine whether the condition for the Hybrid Automatic Repeat request process is met, depending on a comparison of the time to a reference.

In some embodiments of the first apparatus, the condition is relating to at least one content of a data unit stored in the Hybrid Automatic Repeat request process.

In some embodiments of the first apparatus the at least one memory and the instructions are configured to, with the at least one processor, further cause the terminal device to determine not to change the at least one transmission configuration if the retransmission of the data packet indicated in the retransmission grant is performed or to be performed.

In some embodiments of the first apparatus the retransmission grant is a dynamic scheduled retransmission grant or a configured grant autonomous transmission or a configured grant autonomous retransmission.

Some embodiments relate to a second apparatus, comprising at least one processor, and at least one memory storing instructions, the at least one memory and the instructions configured to, with the at least one processor, cause a network device to configure at least one configuration parameter for a Hybrid Automatic Repeat request process, and to send the at least one configuration parameter to at least one terminal device, wherein the at least one configuration parameter indicates the at least one terminal device a condition under which the at least one terminal device skips at least one retransmission of a data packet in the Hybrid Automatic Repeat request process.

In some embodiments of the second apparatus the at least one configuration parameter indicates the at least one terminal device a condition under which the at least one terminal device changes at least one transmission configuration of a Data Radio Bearer for transmission of at least one subsequent data packet.

In some embodiments of the second apparatus the at least one configuration parameter indicates the at least one terminal device not to change the at least one transmission configuration of the Data Radio Bearer for the transmission of the at least one subsequent data packet if the retransmission of the data packet indicated in the retransmission grant is performed or to be performed.

Some embodiments relate to a third apparatus as a terminal device, comprising means for performing receiving a retransmission grant for a data packet for a Hybrid Automatic Repeat request process; based on at least one configuration parameter, determining whether a condition for the Hybrid Automatic Repeat request process is met; and in accordance with a determination that the condition is met, skipping the retransmission of the data packet indicated in the retransmission grant.

In some embodiments of the third apparatus, the means are further configured to perform receiving at the terminal device, the at least one configuration parameter for the condition and to configure the condition according to the at least one configuration parameter.

In some embodiments of the third apparatus, the means are further configured to perform changing at least one transmission configuration of a Data Radio Bearer for transmission of at least one subsequent data packet.

In some embodiments of the third apparatus, the means are further configured to perform determining that the condition for the Hybrid Automatic Repeat request process is met, when a timer is expired or not running.

In some embodiments of the third apparatus, the means are further configured to perform determining a duration of the timer based on the at least one configuration parameter.

In some embodiments of the third apparatus, the means are further configured to perform starting the timer at a moment of a first transmission of the data packet performed in the Hybrid Automatic Repeat request process or a first transmission opportunity allocated for transmitting the data packet in the Hybrid Automatic Repeat request process.

In some embodiments of the third apparatus, the means are further configured to perform determining a number of retransmission grants for retransmitting the data packet or retransmissions of the data packet performed in the Hybrid Automatic Repeat request process, and determining whether the condition is met, depending on a comparison of the number to a reference.

In some embodiments of the third apparatus, the means are further configured to perform determining the reference depending on the at least one configuration parameter.

In some embodiments of the third apparatus, the means are further configured to perform determining the number accounting for or disregarding retransmissions of the data packet that are performed by the terminal device autonomously for the Hybrid Automatic Repeat request process.

In some embodiments of the third apparatus, the means are further configured to perform determining a time between a reception of an initial uplink transmission grant for transmitting the data packet and a reception of the retransmission grant for retransmitting the data packet in the Hybrid Automatic Repeat request process, and determining whether the condition for the Hybrid Automatic Repeat request process is met, depending on a comparison of the time to a reference.

In some embodiments of the third apparatus, the condition is relating to at least one content of a data unit stored in the Hybrid Automatic Repeat request process.

In some embodiments of the third apparatus, the means are further configured to perform determining not to change the at least one transmission configuration if the retransmission of the data packet indicated in the retransmission grant is performed or to be performed.

In some embodiments of the third apparatus, the retransmission grant is a dynamic scheduled retransmission grant or a configured grant autonomous transmission or a configured grant autonomous retransmission.

Some embodiments relate to a fourth apparatus as a network device, comprising means for performing configuring at least one configuration parameter for a Hybrid Automatic Repeat request process, and sending the at least one configuration parameter to at least one terminal device, wherein the at least one configuration parameter indicates the at least one terminal device a condition under which the at least one terminal device skips at least one retransmission of a data packet in the Hybrid Automatic Repeat request process.

In some embodiments of the fourth apparatus, the at least one configuration parameter indicates the at least one terminal device a condition under which the at least one terminal device changes at least one transmission configuration of a Data Radio Bearer for transmission of at least one subsequent data packet.

In some embodiments of the fourth apparatus, the at least one configuration parameter indicates the at least one terminal device not to change the at least one transmission configuration of the Data Radio Bearer for the transmission of the at least one subsequent data packet if the retransmission of the data packet indicated in the retransmission grant is performed or to be performed.

DESCRIPTION OF SOME EXEMPLARY EMBODIMENTS

Figure 1:
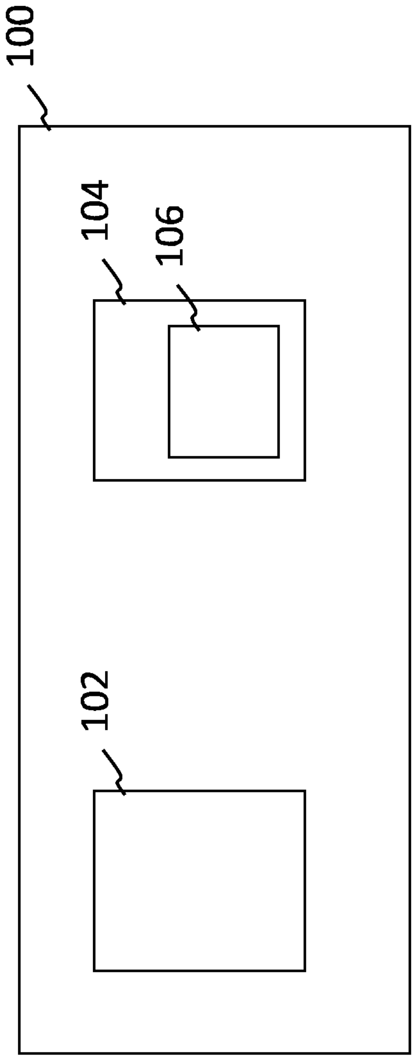
FIG. 1 schematically depicts a simplified block diagram of a first apparatus, FIG. 2 schematically depicts a simplified block diagram of a second apparatus, FIG. 3 schematically depicts a simplified block diagram of a communication network, FIG. 4 schematically depicts a first signaling chart, FIG. 5 schematically depicts a second signaling chart, FIG. 6 schematically depicts a third signaling chart, FIG. 7 schematically depicts a fourth signaling chart, FIG. 8 schematically depicts a first flow chart, FIG. 9 schematically depicts a second flow chart, FIG. 10 schematically depicts a third flow chart, FIG. 11 schematically depicts a fourth flow chart, FIG. 12 schematically depicts a first example, FIG. 13 schematically depicts a second example.

FIG. 1 schematically depicts a simplified block diagram of a first apparatus 100. The first apparatus 100 comprises at least one processor 102 and at least one memory 104 storing instructions 106.

Figure 2:
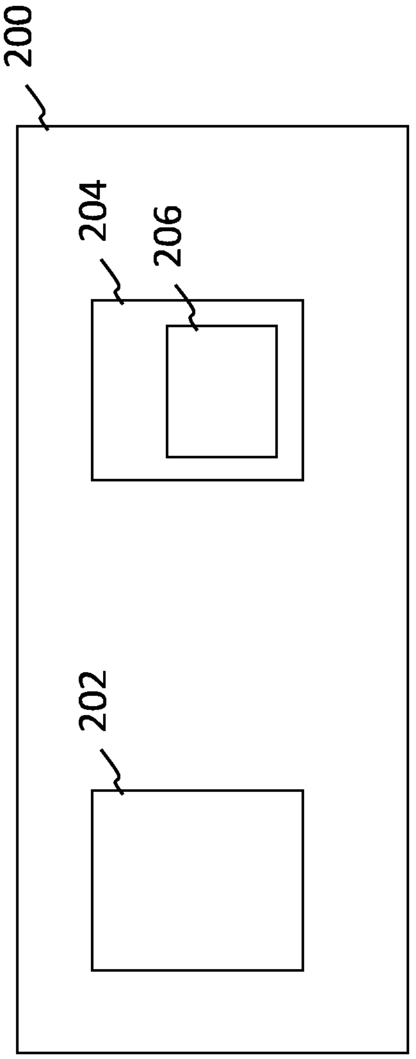

FIG. 2 schematically depicts a simplified block diagram of a second apparatus 200. The second apparatus 200 comprises at least one processor 202 and at least one memory 204 storing instructions 206.

Figure 3:
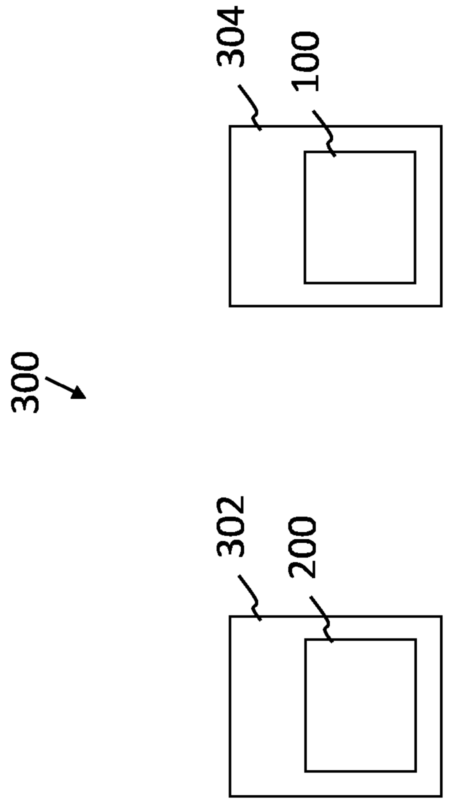

FIG. 3 schematically depicts a simplified block diagram of a communication network 300. The communication network 300 comprises a network device 302, e.g. a base station. The communication network 300 comprises a terminal device 304, e.g. a user equipment.

In some embodiments of the first apparatus 100, the at least one memory 104 and the instructions 106 may be configured to, with the at least one processor 102, cause the terminal device 304 to receive a retransmission grant.

In some embodiments, of the first apparatus 100, the at least one memory 104 and the instructions 106 may be configured to, cause the terminal device 304 to receive the retransmission grant for a specific Hybrid automatic repeat request, HARQ, process.

In some embodiments of the first apparatus 100, the at least one memory 104 and the instructions 106 may be configured to, with the at least one processor 102, cause the terminal device 304 to receive the retransmission grant for a data packet.

In some embodiments of the first apparatus 100, the at least one memory 104 and the instructions 106 may be configured to, with the at least one processor 102, cause the terminal device 304 to change at least one transmission configuration for transmission of data from a Data Radio Bearer.

In some embodiments, the Data Radio Bearer may be configured according to the at least one transmission configuration to transmit data to achieve a first reliability target or to transmit data to achieve a second reliability target.

In some embodiments of the first apparatus 100, the at least one memory 104 and the instructions 106 may be configured to, with the at least one processor 102, cause the terminal device 304 to change at least one parameter of a transmission configuration for a transmission of data from a data radio bearer.

By way of example, the transmission configurations may comprise parameters.

The parameters may comprise a modulation and coding scheme, MCS, a physical resource block allocation, a number of repetitions, a transmission power, a frequency hopping configuration, at least one logical channel configuration parameter, e.g. a logical channel priority, a logical channel mapping restriction, and/or a set of Radio Link Control entities used to process or duplicate a Packet Data Convergence Protocol Protocol Data Unit. One or multiple of these parameters may be adjusted to reach a certain reliability or error-probability target.

In some embodiments, the second reliability target may be higher than the first reliability target.

In some embodiments, the Data Radio Bearer may be configured in a first state, e.g. a normal state, to operate with the first reliability target.

In some embodiments, the Data Radio Bearer may be configured in a second state, e.g. a survival time state, to operate with the second reliability target.

In some embodiments of the first apparatus 100, the at least one memory 104 and the instructions 106 may be configured to, with the at least one processor 102, change the at least one transmission configuration for the transmission of at least one subsequent data packet.

For example, the first apparatus 100, the at least one memory 104 and the instructions 106 may be configured to, with the at least one processor 102, change the least one transmission configuration corresponding to the second state to the at least one transmission configuration corresponding to the first state.

In some embodiments of the first apparatus 100, the at least one memory 104 and the instructions 106 may be configured to, with the at least one processor 102, change the at least one transmission configuration corresponding to the first state to the at least one transmission configuration corresponding to the second state to increase a reliability for transmission of subsequent data from the Data Radio Bearer.

In some embodiments of the first apparatus 100, the at least one memory 104 and the instructions 106 may be configured to, with the at least one processor 102, skip the retransmission of the data packet indicated in the retransmission grant.

In some embodiments of the first apparatus 100, the at least one memory 104 and the instructions 106 may be configured to, with the at least one processor 102, flush its buffer for the HARQ process.

By way of example, a trigger for flushing the buffer may be when a timer expires and/or a configured maximum number of HARQ retransmissions is reached.

In some embodiments, when a retransmission grant is received, the terminal device 304 checks whether the timer is running or not, and determines to skip or not to skip the retransmission accordingly.

In some embodiments, when the timer expires, or a maximum number of retransmissions is reached, the terminal device 304 flushes the buffer. In case a retransmission grant is received by the terminal device 304 at a later time, the retransmission would be skipped since the buffer of the terminal device 304 is empty.

This way, the retransmission grant triggers the second state, e.g. the survival time state, in a more efficient manner that avoids wasting radio resources when e.g. a retransmission violates a packet delay budget.

In some embodiments of the first apparatus 100, the at least one memory 104 and the instructions 106 may be configured to, with the at least one processor 102, determine whether a condition is met, and to skip the retransmission of the data packet that is indicated in the retransmission grant when the condition is met and to perform the retransmission of the data packet as indicated in the retransmission grant otherwise.

In some embodiments of the first apparatus 100, the at least one memory 104 and the instructions 106 may be configured to, with the at least one processor 102, cause the terminal device 304 to determine whether the condition is met, depending on whether the timer is not running, or expired.

In some embodiments of the first apparatus 100, the at least one memory 104 and the instructions 106 may be configured to, with the at least one processor 102, cause the terminal device 304 to determine a duration of the timer depending on at least one configuration parameter.

The at least one configuration parameter may comprise a parameter, e.g. configuredGrantTimer, in a Radio Resource Control, RRC, ConfiguredGrantConfig Information Element, IE, for configured scheduling.

The at least one configuration parameter may comprise a new parameter, e.g. retransmissionSkipTimer. In some embodiments of the first apparatus 100, the at least one memory 104 and the instructions 106 may be configured to, with the at least one processor 102, start the timer at a moment of a first transmission or a first transmission opportunity for transmitting the data packet.

In some embodiments of the first apparatus 100, the at least one memory 104 and the instructions 106 may be configured to, with the at least one processor 102, cause the terminal device 304 to determine a number of retransmission grants for the data packet or retransmissions of the data packet, and determine whether the condition is met, depending on a comparison of the number to a reference.

In some embodiments of the first apparatus, the condition is relating to at least one content of a data unit stored in the Hybrid Automatic Repeat request process.

In some embodiments of the first apparatus 100, the at least one memory 104 and the instructions 106 may be configured to, with the at least one processor 102, cause the terminal device 304 to determine the reference depending on the at least one configuration parameter.

The at least one configuration parameter may comprise a new parameter, e.g. N, a maximum number of retransmissions, in a LogicalChannelConfig IE.

The at least one configuration parameter may comprise a single-bit indication, e.g. a skipReTxGrant flag.

In some embodiments of the first apparatus 100, the at least one memory 104 and the instructions 106 may be configured to, with the at least one processor 102, cause the terminal device 304 to determine the number accounting for retransmissions of the data packet that are performed by the terminal device 304 autonomously and/or independently of retransmission grants.

In some embodiments of the first apparatus 100, the at least one memory 104 and the instructions 106 may be configured to, with the at least one processor 102, cause the terminal device 304 to receive at least one configuration parameter and to configure the condition according to the at least one configuration parameter.

In some embodiments of the second apparatus 200, the at least one memory 204 and the instructions 206 may be configured to, with the at least one processor 202, cause the network device 302 to send the at least one configuration parameter to the terminal device 304.

In some embodiments, the terminal device 304 may be configured by the network device 302 to skip triggering the second state based on an optional parameter, e.g. SurvivalTimeStateUponSkippedRetxGrant. The at least one configuration parameter may comprise the optional parameter.

Figure 4:
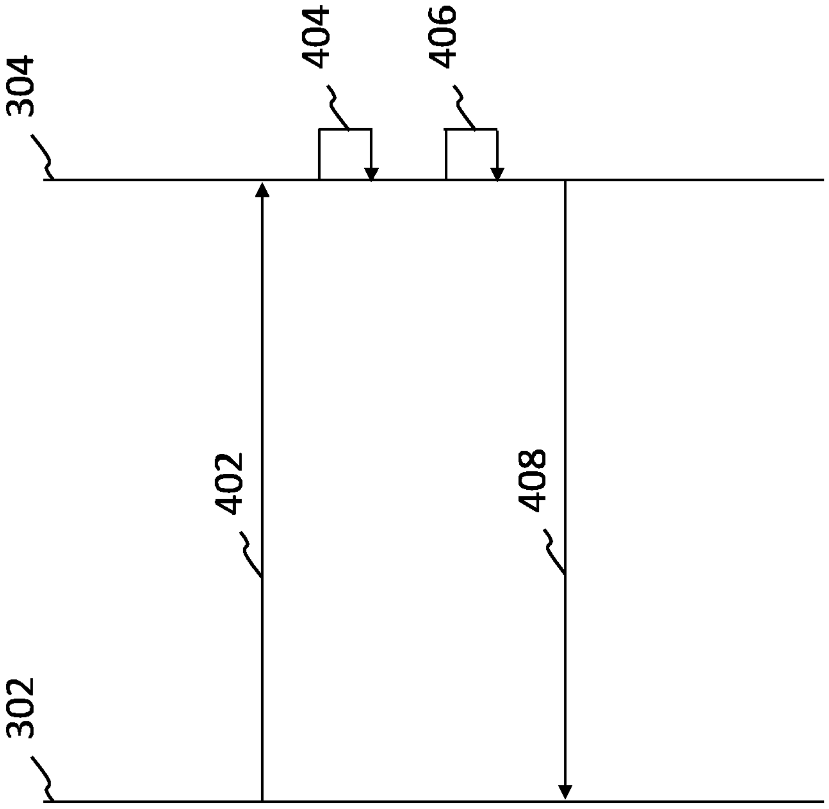

Steps of a method in the terminal device 304 are described with reference to FIG. 4.

The method may comprise receiving 402 a retransmission grant for a Hybrid Automatic Repeat request, HARQ, process.

In some embodiments, the retransmission grant may be sent 402 by the network device 302.

In some embodiments, the retransmission grant may be for a specific HARQ process for a data packet transmitted on a Physical Uplink Shared Channel.

The method may comprise changing 406 at least one transmission configuration of a Data Radio Bearer for transmission of at least one subsequent data packet.

In some embodiments, the method may comprise determining 404 whether a condition for the HARQ process is met, and in accordance with a determination that the condition is met, to skip the retransmission of the data packet indicated in the retransmission grant.

In some embodiments, the method may comprise flushing its buffer for the HARQ process.

In some embodiments, the method may comprise determining whether the condition for the HARQ process is met, when a timer is not running, or expired.

An example for the timer is configuredGrantTimer in RRC specification. A new timer may be defined as well, e.g. retransmissionSkipTimer, that is defined exclusively for purpose of determining whether to skip or not to skip the retransmission grant.

In some embodiments, the method may comprise determining 404 whether the condition for the HARQ process is met, depending on a number of retransmission grants for the data packet or retransmissions of the data packet.

In some embodiments, the method may comprise determining 404 whether the condition for the HARQ process is met, depending on a comparison of the number to a reference.

In some embodiments of the condition may relate to at least one content of a data unit stored in the Hybrid Automatic Repeat request process.

In one exemplary embodiment, the terminal device 304 may determine if the retransmission grant for HARQ process should be skipped or ignored based on at least one of:

- The Logical Channels, LCHs, that are mapped to the data unit stored in this HARQ process;
- At least one parameter, e.g. priority levels, of the at least one LCH that is mapped to the data unit stored in this HARQ process;
- The presence of any data from any Signaling Radio Bearer, SRB, in the data unit stored in this HARQ process;
- The types or contents of at least one Medium Access Control Control Elements that is mapped to the data unit stored in this HARQ process; and
- Whether the data unit only contain only padding or periodic Buffer Status Reports, BSRs.

Figure 5:
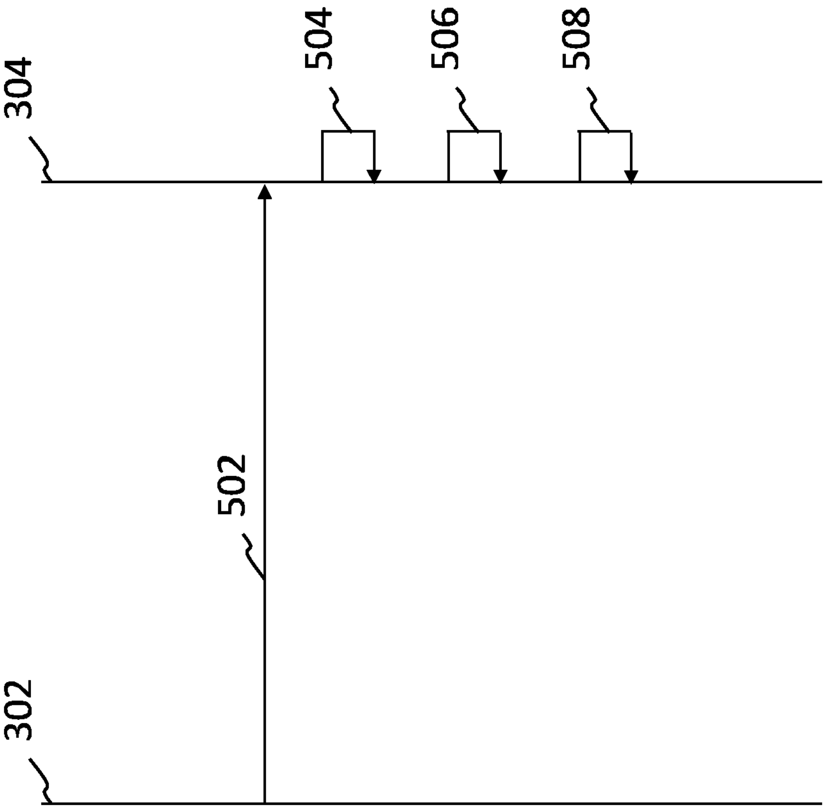

In some embodiments, the method in the terminal device 304 may comprise further steps that concern the timer. These are described with reference to FIG. 5.

In some embodiments, the method in the terminal device 304 may comprise receiving 502 the at least one configuration parameter and configuring the condition according to the at least one configuration parameter.

In some embodiments, the at least one configuration parameter may be sent 502 by the network device 302.

In some embodiments, the method may comprise determining 504 a moment of a first transmission opportunity that is indicated in an uplink grant.

In some embodiments the uplink grant may be scheduled for the terminal device 304 according to an uplink grant configuration for the terminal device 304.

In some embodiments the uplink grant may be scheduled for the terminal device 304 dynamically.

In some embodiments, the method may comprise starting 506 the timer at the moment of the first transmission of the data packet performed in the HARQ process or a first transmission opportunity allocated for transmitting the data packet in the HARQ process.

In some embodiments, the method may comprise starting the timer at the moment of the first transmission opportunity for the HARQ process even if it's not eventually transmitted, e.g. due to an intra-terminal device 304 prioritization or a Listen-before Talk failure. An initial or first transmission for the HARQ process can refer to a data unit or data packet stored in a HARQ buffer of that HARQ process.

In some embodiments the duration of the timer may be determined based on the at least one configuration parameter.

In some embodiments, the method may comprise changing 508 the timer. Changing the time may comprise restarting, stopping or resetting the time.

In some embodiments, the timer is reset or restarted when another uplink grant is received.

In some embodiments, for a configured grant, an existing Radio Resource Control parameter, e.g. a parameter indicated as part of a configured grant configuration according to the Radio Resource Control, may be used as the timer.

In some embodiments, a one bit flag in the configured grant configuration may instruct the terminal device 304 to use an existing Radio Resource Control parameter as timer for at least one of the following purposes:

To allow the terminal device 304 to map a new transmission on the HARQ process if the timer for the HARQ process is not running, and to instruct the terminal device 304 to ignore the retransmission grant on a HARQ process if the timer for the HARQ process is not running.

To instruct the terminal device 304 to flush its buffer for the corresponding HARQ process when the timer expires.

In some embodiments, for a configured grant configuration according to the Radio Resource Control for an unlicensed band, another existing Radio Resource Control parameter may be used for at least one of the following purposes:

To instruct the terminal device 304 to skip or ignore its autonomous retransmission of the data packet.

To instruct the terminal device 304 to flush its buffer in case a corresponding HARQ process is determined as pending at the moment of the autonomous retransmission.

In some embodiments, the timer may be an additional timer that is defined for the purpose of determining whether the condition is met or not.

In some embodiments, the additional timer is defined exclusively for that purpose.

The duration of the timer can be provided in the unit of symbols, slots, sub frames, milliseconds, or in multiples of the periodicity of a transmission grant.

In some embodiments, the additional timer may be applicable to configured grants and dynamic grants.

In some embodiments for configured grants, the additional timer may follow a different start or restart procedure as an existing timer.

In some embodiments, the additional timer may not be restarted when a new transmission grant is received.

In some embodiments, the additional timer may be set to values shorter than a periodicity of a transmission grant. In some embodiments, the timer may be set to a value that is a non-integer multiple of the periodicity of a transmission grant.

In some embodiments, the method may comprise setting the duration of the additional timer depending on the at least one configuration parameter.

In some embodiments, the timer or the additional timer is a countdown timer. The countdown timer may be configured to start at a RRC-configured value and counts down to e.g. zero. The countdown timer may be configured to stop running or expire for example, when zero is reached.

In some embodiments, the method may comprise checking whether the timer is running or not with respect to a first symbol of an uplink grant received via the Physical Downlink Control Channel. However, any of the following options are also possible:

To check whether the timer is running or not with respect to a start or an end of the Physical Downlink Control Channel.

To check whether the timer is running or not with respect to, when the Medium Access Control received the uplink grant, e.g. at the end of the Physical Downlink Control Channel+some additional time for the Physical Downlink Control Channel processing time.

To check whether the timer is running or not with respect to, a start or an end of the Physical Uplink Shared Channel.

In some embodiments, the method may comprise setting the duration of the timer accordingly to achieve that the timer is shorter than a time between an initial transmission and an expected time for receiving the retransmission grant.

In some embodiments, the method may comprise in case of a configured grant configuration for unlicensed band, that the terminal device 304 and the network device 302 perform a clear channel assessment.

In some embodiments, the method may comprise skipping the autonomous retransmission in a case where Listen-before Talk fails, the timer is not running and the HARQ process is determined as pending.

In some embodiments, the method may comprise setting a duration of the timer with an instruction to skip already a first Physical Downlink Shared Channel retransmissions, e.g. setting the maximum number of retransmission grants N=0.

Figure 6:
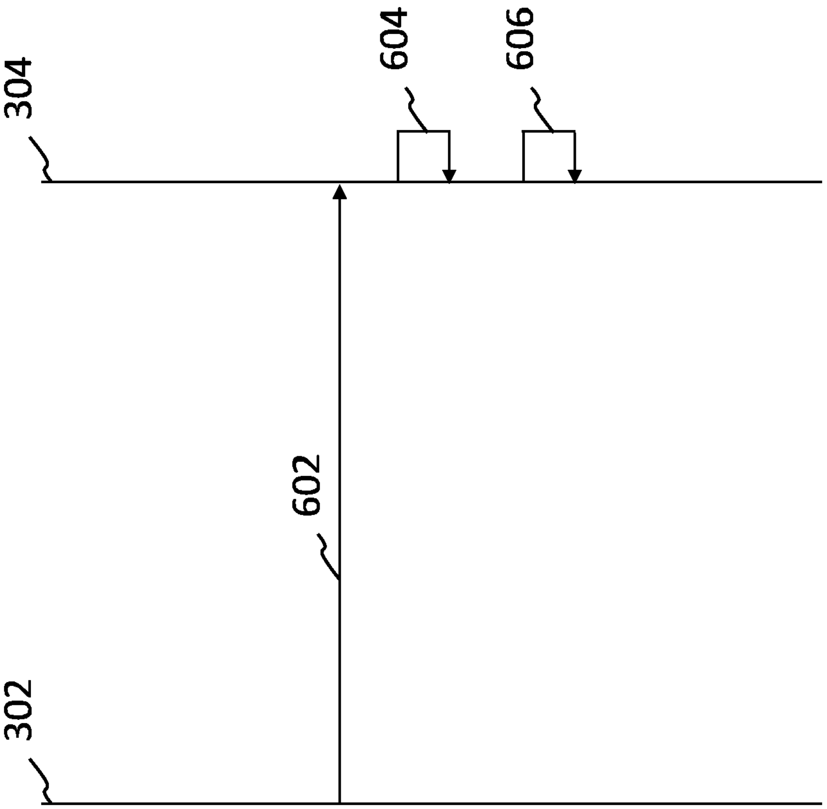

In some embodiments, the method in the terminal device 304 may comprise further steps that concern the number of retransmission grants. These are described with reference to FIG. 6.

In some embodiments, the method may comprise receiving 602 the at least one configuration parameter.

In some embodiments, the at least one configuration parameter may be sent 602 by the network device 302.

In some embodiments, the method may comprise determining 604 the reference from the at least one configuration parameter.

In some embodiments, the method may comprise determining 606 the number accounting for retransmissions of the data packet that are performed by the terminal device 304 autonomously and/or independently of retransmission grants.

By way of example, if the terminal device 304 should assume skipping after two retransmissions have occurred, then if the terminal device 304 makes one autonomous retransmission and one scheduled retransmission, then the terminal device 304 should skip a next upcoming retransmission if any. This means, in the example, the autonomous retransmission counts.

In some embodiments, the condition to skip the retransmission grant may be provided in terms of a indicated maximum number N of HARQ retransmissions.

In some embodiments, the number N may be an integer, N=[0, 1, 2, . . . ].

In some embodiments, the method may comprise configuring the number N per logical channel, with e.g. a parameter in a logical channel configuration information element, which indicates which behavior based on the number N is applicable to the HARQ processes storing a data unit containing data from this logical channel.

In some embodiments, the method may comprise determining the number N from a single-bit indicator where the value of N is fixed in a specification.

In some embodiments, the method in the terminal device 304 may comprise checking whether the indicated the maximum number N of retransmissions has been exceeded or not.

In some embodiments, the method may comprise accounting for autonomous retransmissions as retransmission opportunities.

In some embodiments, the method may comprise accounting for autonomous retransmissions that are triggered by a potential Listen-before Talk failure in an unlicensed band as retransmission opportunities.

In some embodiments, the method may comprise accounting for autonomous transmissions that are triggered due to a deprioritization of previous Physical Uplink Shared Channel occasion as retransmission opportunities.

In some embodiments, the method in the terminal device 304 may comprise discounting autonomous transmissions from the maximum number N of retransmissions.

In some embodiments, the method in the terminal device 304 configured with N=1 may comprise skipping or ignoring a retransmission grant of the next retransmission, if the terminal device 304 performs one autonomous retransmission.

Figure 7:
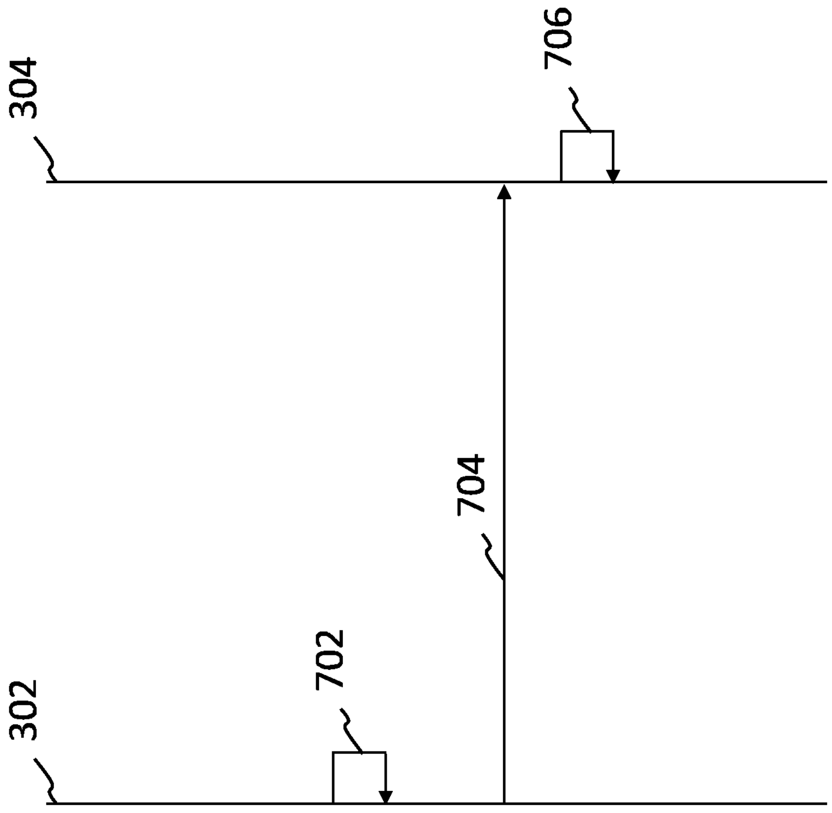

In some embodiments, a method in the network device 302 and the terminal device 304 may comprise further steps that concern the configuration of the terminal device 304. These are described with reference to FIG. 7.

In some embodiments, the method may comprise determining 702 the at least one configuration parameter at the network device 302.

In some embodiments, the method may comprise configuring 702 a binary flag, that instructs the terminal device 304 whether, e.g. YES or NO, it should skip the retransmission grant based on data unit content.

In some embodiments, the method may comprise configuring 702 a configuration message that instructs the terminal device 304 what contents of data unit would make the terminal device 304 to skip the retransmission grant based on data unit content.

In some embodiments, the method may comprise transmitting 704 the at least one configuration parameter from the network device 302 to the terminal device 304.

In some embodiments, the optional parameter, e.g. SurvivalTimeStateUponSkippedRetxGrant may be transmitted as well.

In some embodiments, the method may comprise transmitting 704 the binary flag.

In some embodiments, the method may comprise transmitting 704 the configuration message.

In some embodiments, the method may comprise configuring 706 the condition according to the at least one configuration parameter.

In some embodiments, the method may comprise configuring 706 the condition according to the binary flag to skip the retransmission grant based on data unit content or not to skip the retransmission grant based on data unit content.

In some embodiments, the method may comprise configuring 706 the condition to skip the retransmission grant based on content of a data unit indicated in the configuration message, or not to skip the retransmission grant based on the content of the data unit indicated in the configuration message.

In some embodiments, the method may comprise determining 706 not to change the at least one transmission configuration of the Data Radio Bearer for the transmission of the at least one subsequent data packet, if the retransmission of the data packet indicated in the retransmission grant is performed or to be performed.

In some embodiments, the at least one configuration parameter indicates the at least one terminal device 304 a condition under which the at least one terminal device 304 skips at least one retransmission of a data packet in the Hybrid Automatic Repeat request process.

In some embodiments, the at least one configuration parameter indicates the at least one terminal device 304 a condition under which the at least one terminal device 304 changes at least one transmission configuration of a Data Radio Bearer for transmission of at least one subsequent data packet.

In some embodiments, the at least one configuration parameter indicates the at least one terminal device 304 not to change the at least one transmission configuration of the Data Radio Bearer for the transmission of the at least one subsequent data packet, if the retransmission of the data packet indicated in the retransmission grant is performed or to be performed.

In some embodiments, the terminal device 304 is configured by the network device 302 to skip triggering the second state based on the optional parameter, e.g. SurvivalTimeStateUponSkippedRetxGrant.

In some embodiments, the method may comprise in case of a configured grant configuration for unlicensed band selecting the configuration parameter so that the terminal device 304 and the network device 302 perform a clear channel assessment.

In some embodiments, the method may comprise selecting the configuration parameter so that the terminal device 304 skips the autonomous retransmission in a case where Listen-before Talk fails, the timer is not running and the HARQ process is determined as pending.

In some embodiments, the method may comprise selecting the configuration parameter to set a duration of the timer with an instruction to skip already a first retransmission, e.g. setting the maximum number of retransmission grants N=0.

Figure 8:
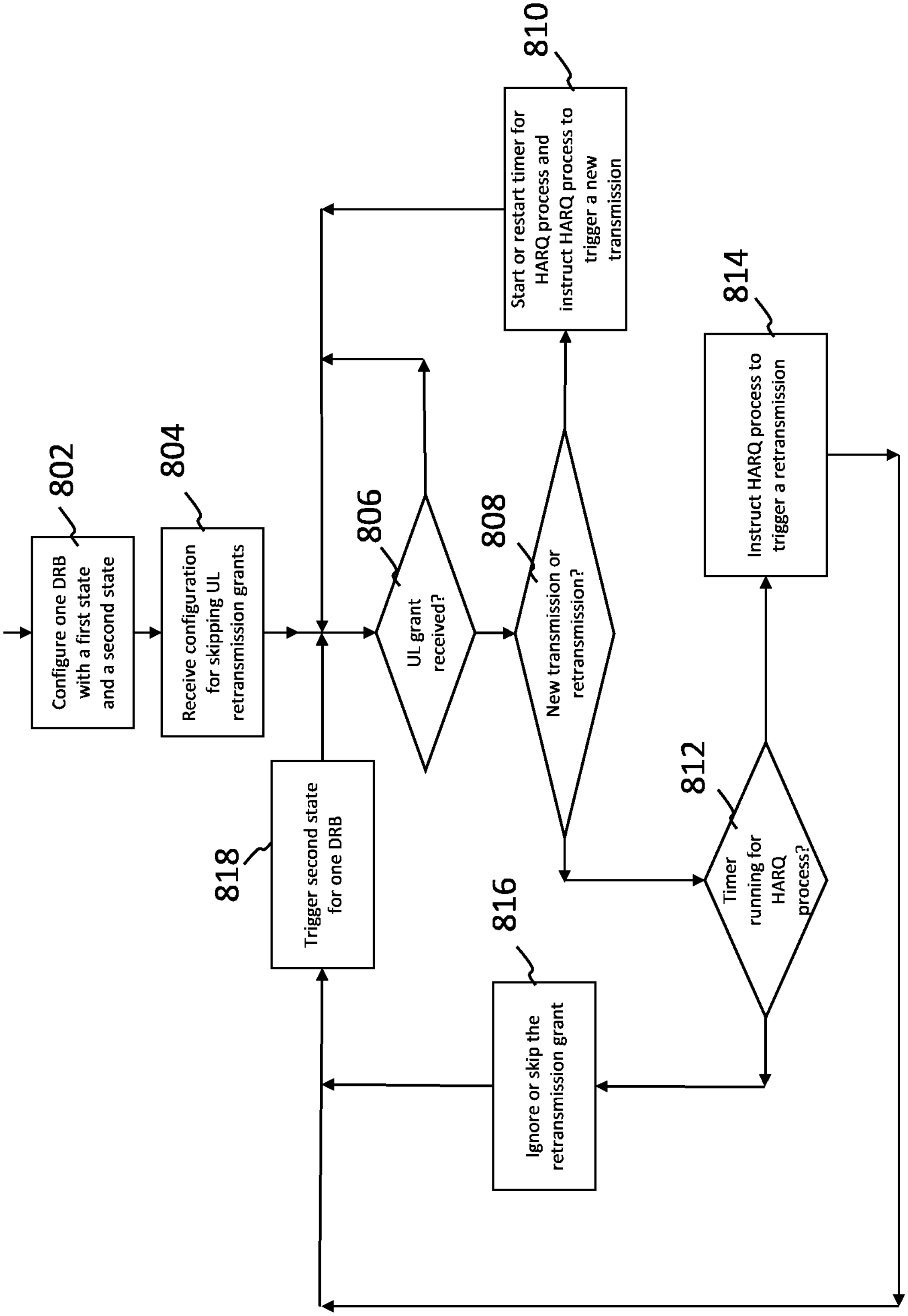

A first exemplary operation performed at the terminal device 304 is described with reference to FIG. 8.

In a step 802, one Data Radio Bearer, DRB, is configured to selectively operate in the first state and the second state. In the example, the terminal device 304 is initially configured to operate in the first state.

Afterwards, in a step 804, a configuration for skipping uplink retransmission, UL, grants is received. In the example, the configuration parameter for the terminal device 304 is received. In the example, the condition to change to the second state is configured according to the configuration parameter. According to an example, the configuration parameter comprises the timer and the condition is configured to be met while the timer runs or until the timer expires.

Afterwards, a step 806 is executed.

In the step 806 it is determined, whether an UL grant is received. If an UL grant is received, a step 808 is executed. Otherwise the step 806 is executed.

In the step 808, it is determined, whether the grant is for a new transmission or a retransmission. If the grant is for a new transmission a step 810 is executed. Otherwise a step 812 is executed.

In the step 810, the timer is started or restarted for a HARQ process and the HARQ process is instructed to trigger a new transmission.

Afterwards the step 806 is executed.

In the step 812, it is determined, whether the timer for the HARQ process is running. If the timer for the HARQ process is running, a step 814 is executed. Otherwise a step 816 is executed.

In step 814, the HARQ process is instructed to trigger a retransmission. Afterwards a step 818 is executed.

In step 816, the retransmission grant is skipped or ignored. Afterwards the step 818 is executed.

In step 818, the second state is triggered for one DRB.

Afterwards the step 806 is executed.

Figure 9:
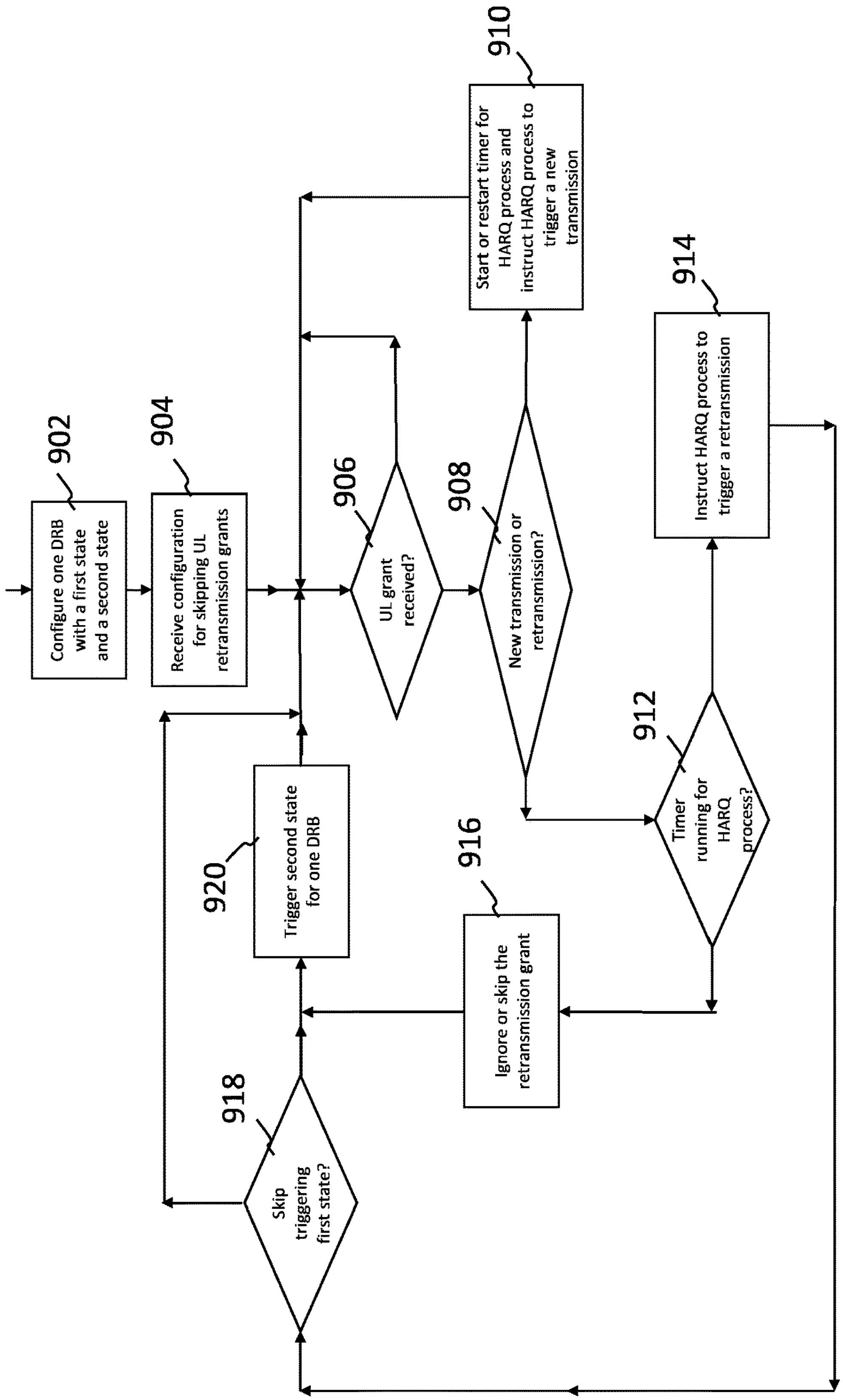

A second exemplary operation is described with reference to FIG. 9.

In a step 902, one Data Radio Bearer, DRB, is configured to selectively operate in the first state and the second state. In the example, the terminal device 304 is initially configured to operate in the first state.

Afterwards, in a step 904, a configuration for skipping uplink retransmission, UL, grants is received. In the example, the configuration parameter for the terminal device 304 is received. In the example, the condition to change to the second state is configured according to the configuration parameter. According to an example, the configuration parameter comprises the timer and the condition is configured to be met while the timer runs or until the timer expires.

Afterwards, a step 906 is executed.

In the step 906 it is determined, whether an UL grant is received. If an UL grant is received, a step 908 is executed. Otherwise the step 906 is executed.

In the step 908, it is determined, whether the grant is for a new transmission or a retransmission. If the grant is for a new transmission a step 910 is executed. Otherwise a step 912 is executed.

In the step 910, the timer is started or restarted for a HARQ process and the HARQ process is instructed to trigger a new transmission.

Afterwards the step 906 is executed.

In the step 912, it is determined, whether the timer for the HARQ process is running. If the timer for the HARQ process is running, a step 914 is executed. Otherwise a step 916 is executed.

In step 914, the HARQ process is instructed to trigger a retransmission. Afterwards a step 918 is executed.

In step 916, the retransmission grant is skipped or ignored. Afterwards a step 920 is executed.

In Step 918, it is determined whether the terminal device 304 is configured to skip triggering the second state. The terminal device 304 may be configured to skip triggering the second state based on the optional parameter, e.g. SurvivalTimeStateUponSkippedRetxGrant. When the terminal device 304 is configured to skip triggering the second state, the step 906 is executed. Otherwise, the step 920 is executed.

In step 920, the second state is triggered for one DRB.

Afterwards the step 906 is executed.

Figure 10:
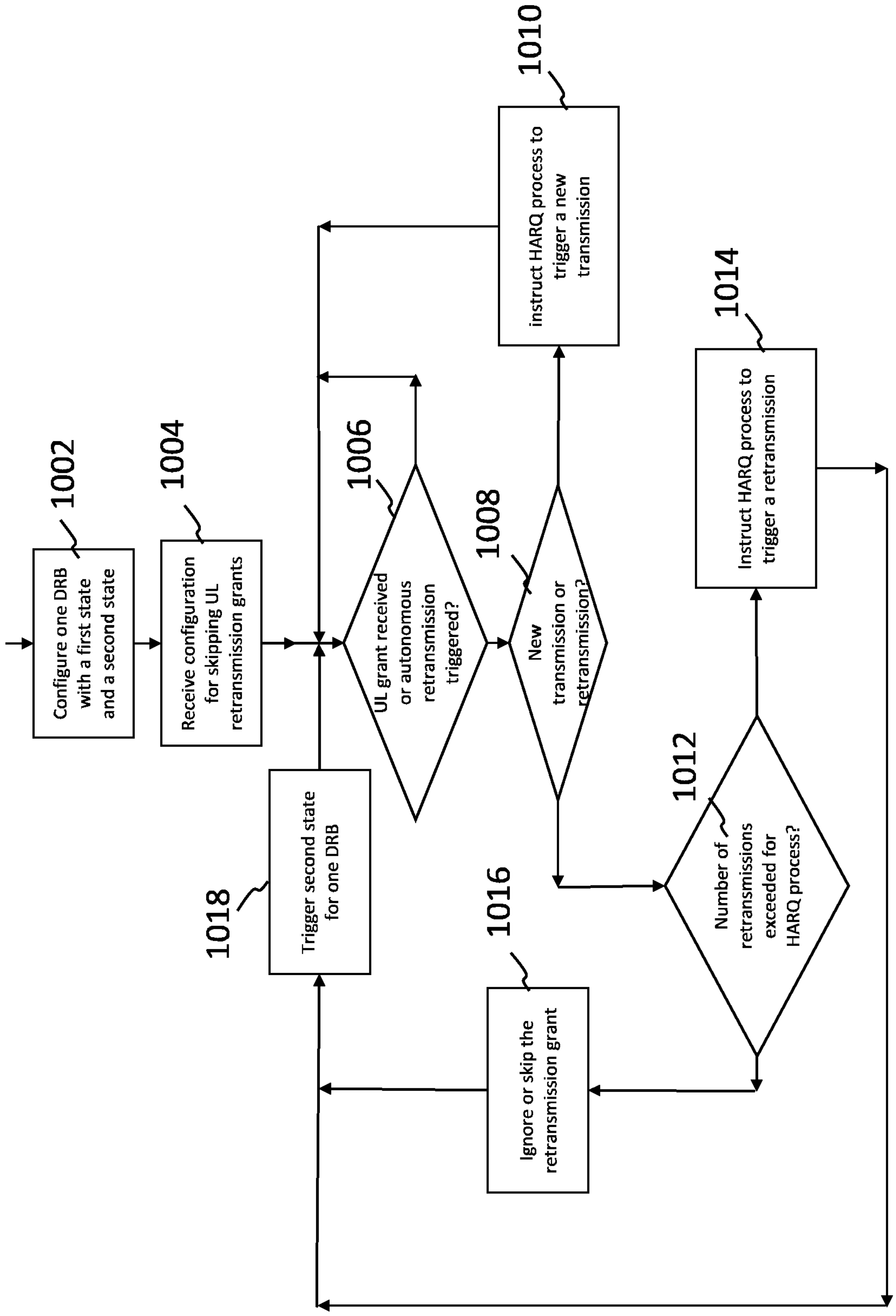

A third exemplary operation is described with reference to FIG. 10.

In a step 1002, one Data Radio Bearer, DRB, is configured to selectively operate in the first state and the second state. In the example, the terminal device 304 is initially configured to operate in the first state.

Afterwards, in a step 1004, a configuration for skipping uplink retransmission, UL, grants is received. In the example, the configuration parameter for the terminal device 304 is received. In the example, the condition to change to the second state is configured according to the configuration parameter. According to an example, the configuration parameter comprises the maximum number of retransmissions.

Afterwards, a step 1006 is executed.

In the step 1006 it is determined, whether an UL grant is received or an autonomous retransmission is triggered. If an UL grant is received or an autonomous retransmission is triggered, a step 1008 is executed. Otherwise the step 1006 is executed.

In the step 1008, it is determined, whether the grant is for a new transmission or a retransmission. If the grant is for a new transmission a step 1010 is executed. Otherwise a step 1012 is executed.

In the step 1010, the HARQ process is instructed to trigger a new transmission.

Afterwards the step 1006 is executed.

In the step 1012, it is determined, whether the number of retransmissions is exceeded for the HARQ process. If the number of retransmissions is not exceeded for the HARQ process, a step 1014 is executed. Otherwise a step 1016 is executed.

In step 1014, the HARQ process is instructed to trigger a new transmission. Afterwards a step 1018 is executed.

In step 1016, the retransmission grant is skipped or ignored. Afterwards the step 1018 is executed.

In step 1018, the second state is triggered for one DRB. Afterwards the step 1006 is executed.

Figure 11:
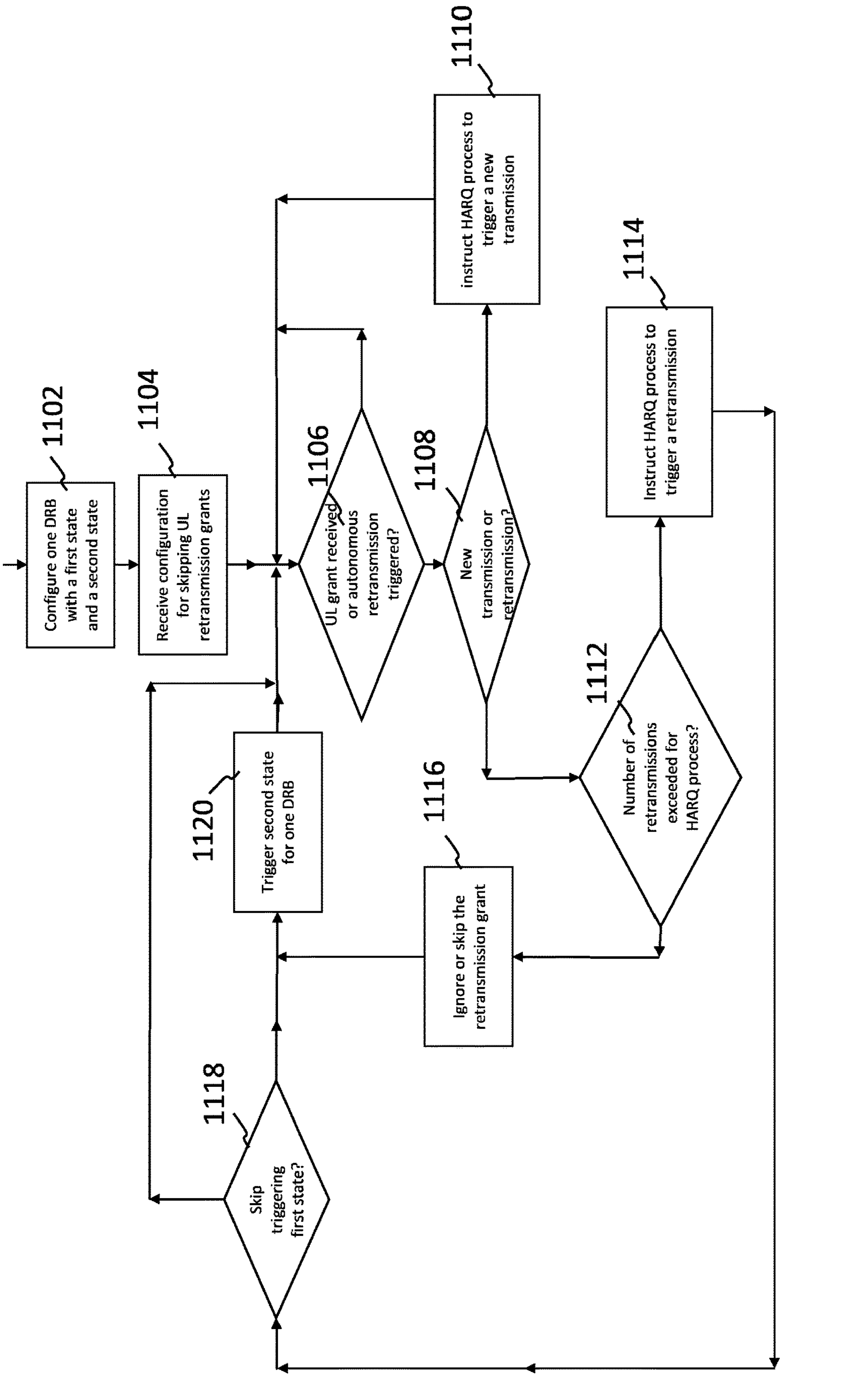

A second exemplary operation is described with reference to FIG. 11.

In a step 1102, one Data Radio Bearer, DRB, is configured to selectively operate in the first state and the second state. In the example, the terminal device 304 is initially configured to operate in the first state.

Afterwards, in a step 1104, a configuration for skipping uplink retransmission, UL, grants is received. In the example, the configuration parameter for the terminal device 304 is received. In the example, the condition to change to the second state is configured according to the configuration parameter. According to an example, the configuration parameter comprises the maximum number of retransmissions.

Afterwards, a step 1106 is executed.

In the step 1106 it is determined, whether an UL grant is received or an autonomous retransmission is triggered. If an UL grant is received or an autonomous retransmission is triggered, a step 1108 is executed. Otherwise the step 1106 is executed.

In the step 1108, it is determined, whether the grant is for a new transmission or a retransmission. If the grant is for a new transmission a step 1110 is executed. Otherwise a step 1112 is executed.

In the step 1110, the HARQ process is instructed to trigger a new transmission.

Afterwards the step 1106 is executed.

In the step 1112, it is determined, whether the number of retransmissions is exceeded for the HARQ process. If the number of retransmissions is not exceeded for the HARQ process, a step 1114 is executed. Otherwise a step 1116 is executed.

In step 1114, the HARQ process is instructed to trigger a new transmission. Afterwards a step 1118 is executed.

In step 1116, the retransmission grant is skipped or ignored. Afterwards a step 1120 is executed.

In Step 1118, it is determined whether the terminal device 304 is configured to skip triggering the second state. The terminal device 304 may be configured to skip triggering the second state based on the optional parameter SurvivalTimeStateUponSkippedRetxGrant. When the terminal device 304 is configured to skip triggering the second state, the step 1106 is executed. Otherwise, the step 1120 is executed.

In step 1120, the second state is triggered for one DRB. Afterwards the step 1106 is executed.

Figure 12:
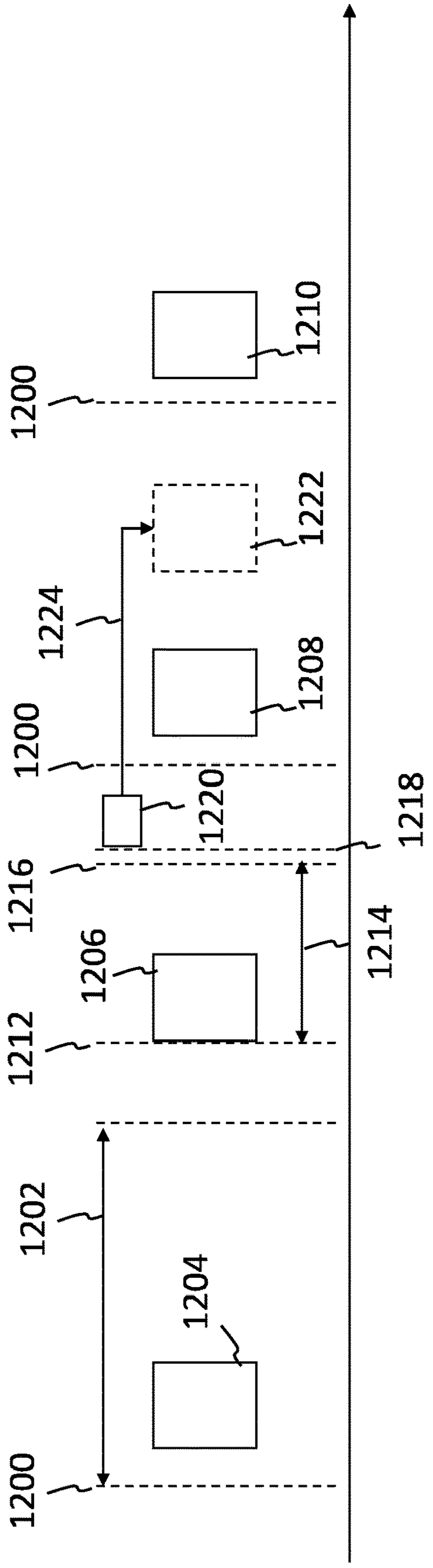

FIG. 12 depicts a first example on how the timer, e.g. the retransmissionSkipTimer or the configuredGrantTimer, may be used. According to the first example, data arrives at the terminal device 304 from higher layers at data arrival times 1200 that are depicted over time t. A packet delay budget 1202 exists between two consecutive data arrival times 1200. In the example, a first Physical Uplink Shared Channel 1204 is followed by a second Physical Uplink Shared Channel 1206, a third Physical Uplink Shared Channel 1208 and a fourth Physical Uplink Shared Channel 1210.

The timer in the first example is provided shorter than a time of start of the second Physical Uplink Shared Channel 1206 and an expected time for receiving a retransmission grant for the second Physical Uplink Shared Channel 1206.

The timer is started in the example at a first moment in time 1212, e.g. the moment of the start of the second Physical Uplink Shared Channel 1206. The duration 1214 of the timer is set in the example, so that the timer expires or is not running at a second moment in time 1216.

At a third moment in time 1218, a retransmission grant 1220, e.g. a corresponding downlink control information, DCI, is received at the terminal device 304. The third moment in time 1218 is later than the second moment in time 1216. Therefore, a first retransmission of the second Physical Uplink Shared Channel 1206, that would be triggered by the retransmission grant 1220 is skipped.

Alternatively, this result is achieved in case the terminal device 304 is configured with an instruction to skip already the first retransmissions, i.e. N=0.

Figure 13:
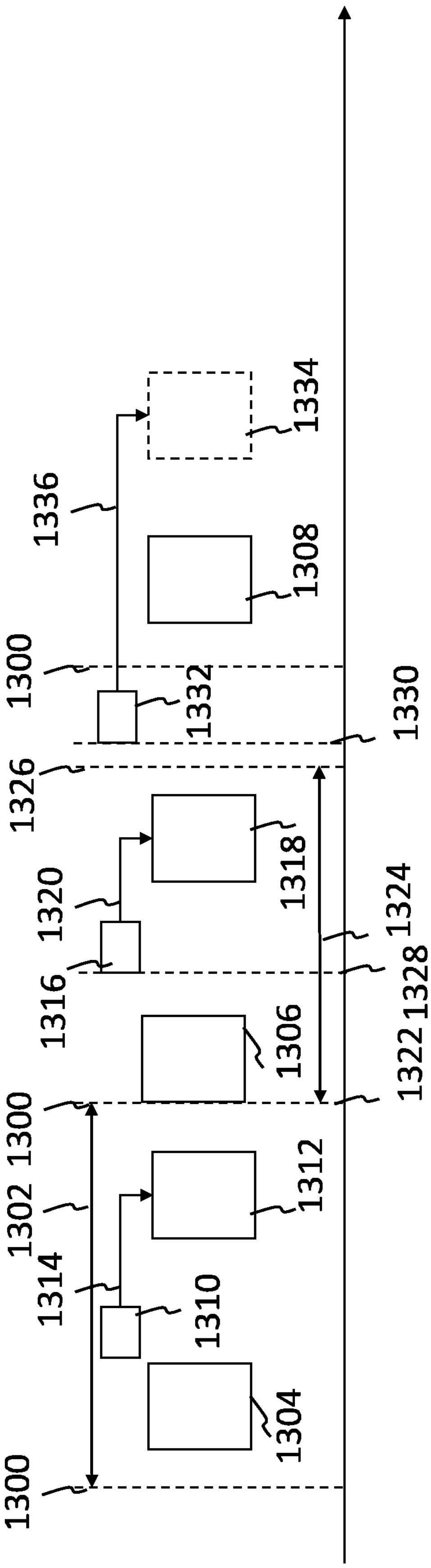

FIG. 13 depicts a second example on how the timer, e.g. the retransmissionSkipTimer or the configuredGrantTimer, is used. According to the second example, data arrives at the terminal device 304 from higher layers at data arrival times 1300 that are depicted over time t. A packet delay budget 1302 exists between two consecutive data arrival times 1300. In the example, a first Physical Uplink Shared Channel 1304 is followed by a second Physical Uplink Shared Channel, 1306, and a third Physical Uplink Shared Channel 1308.

In the second example, after the first Physical Uplink Shared Channel 1304, a first retransmission grant 1310, e.g. a corresponding downlink control information, DCI, is received for the first Physical Uplink Shared Channel 1304 and a first retransmission 1312 for the first Physical Uplink Shared Channel 1304 is triggered with a first time offset 1314 within the packet delay budget 1302.

In the second example, after the second Physical Uplink Shared Channel 1306, a first retransmission grant 1316, e.g. a corresponding downlink control information, DCI, is received for the second Physical Uplink Shared Channel 1306 and a first retransmission 1318 for the second transmission 1306 is triggered with a second time offset 1320 within the packet delay budget 1302.

The timer is started in the second example at a first moment in time 1322, e.g. the moment of the first opportunity for transmitting in the second Physical Uplink Shared Channel 1306. The duration 1324 of the timer is set in the example, so that the timer expires or is not running at a second moment in time 1326.

The first retransmission grant 1316 is received at a third moment in time 1328. The third moment in time 1328 is before the second moment in time 1326. This means, the timer is still running. Therefore, the first retransmission 1318 for the second Physical Uplink Shared Channel 1306 is performed.

According to the second example, at a fourth moment in time 1330, a second retransmission grant 1332 for the second Physical Uplink Shared Channel 1306 is received. The fourth moment in time is later than the second moment in time 1326. This means, the timer is not running or expired. Therefore, the next retransmission for the second Physical Uplink Shared Channel 1306 is skipped.

The invention claimed is:

1. A method in a terminal device, the method comprising:

receiving a retransmission grant for a data packet for a hybrid automatic repeat request process;

determining a time between a reception of an initial uplink transmission grant for transmitting the data packet and a reception of the retransmission grant for retransmitting the data packet in the hybrid automatic repeat request process;

based on at least one configuration parameter, determining whether a condition for the hybrid automatic repeat request process is met based, at least partially, on:

a timer, wherein the timer is started at a first transmission of the data packet performed in the hybrid automatic repeat request process, and a comparison of the time to a reference; and in accordance with a determination that the condition is met, skipping retransmission of the data packet indicated in the retransmission grant.

2. The method according to claim 1, further comprising receiving at the terminal device the at least one configuration parameter for the condition and configuring the condition according to the at least one configuration parameter.

3. The method according to claim 1, further comprising: changing at least one transmission configuration of a data radio bearer for transmission of at least one subsequent data packet.

4. The method according to claim 1, further comprising: determining that the condition for the hybrid automatic repeat request process is met based, at least partially, on the timer being expired or not running.

5. A first apparatus, comprising:

at least one processor; and at least one memory storing instructions that, when executed with the at least one processor, cause the first apparatus at least to:

receive a retransmission grant for a data packet for a hybrid automatic repeat request process;

determine a time between a reception of an initial uplink transmission grant for transmitting the data packet and a reception of the retransmission grant for retransmitting the data packet in the hybrid automatic repeat request process;

based on at least one configuration parameter, determine whether a condition for the hybrid automatic repeat request process is met based, at least partially, on:

a timer, wherein the timer is started at a first transmission of the data packet performed in the hybrid automatic repeat request process, and a comparison of the time to a reference; and in accordance with a determination that the condition is met, skip retransmission of the data packet indicated in the retransmission grant.

6. The first apparatus according to claim 5, wherein the instructions, when executed with the at least one processor, further cause the first apparatus to:

receive the at least one configuration parameter for the condition; and configure the condition according to the at least one configuration parameter.

7. The first apparatus according to claim 5, wherein the instructions, when executed with the at least one processor, further cause the first apparatus to:

change at least one transmission configuration of a data radio bearer for transmission of at least one subsequent data packet.

8. The first apparatus according to claim 5, wherein the instructions, when executed with the at least one processor, further cause the first apparatus to:

determine that the condition for the hybrid automatic repeat request process is met based, at least partially, on the timer being expired or not running.

9. The first apparatus according to claim 5, wherein the instructions, when executed with the at least one processor, further cause the first apparatus to:

determine a duration of the timer based on the at least one configuration parameter.

10. The first apparatus according to claim 5, wherein the instructions, when executed with the at least one processor, further cause the first apparatus to:

determine a number of retransmission grants for retransmitting the data packet or retransmissions of the data packet performed in the hybrid automatic repeat request process; and determine whether the condition is met, depending on a comparison of the number to a further reference.

11. The first apparatus according to claim 10, wherein the instructions, when executed with the at least one processor, further cause the first apparatus to:

determine the further reference depending on the at least one configuration parameter.

12. The first apparatus according to claim 10, wherein the instructions, when executed with the at least one processor, further cause the first apparatus to:

determine the number, accounting for or disregarding retransmissions of the data packet that are performed by the first apparatus autonomously for the hybrid automatic repeat request process.

13. The first apparatus according to claim 5, wherein the condition is relating to at least one content of a data unit stored in the hybrid automatic repeat request process.

14. The first apparatus according to claim 5, wherein the instructions, when executed with the at least one processor, further cause the first apparatus to:

determine not to change at least one transmission configuration based, at least partially, on a determination that the retransmission of the data packet indicated in the retransmission grant is performed or to be performed.

15. The first apparatus according to claim 5, wherein the retransmission grant is a dynamic scheduled retransmission grant or a configured grant autonomous transmission or a configured grant autonomous retransmission.

16. A second apparatus, comprising:

at least one processor;

and at least one memory storing instructions that, when executed with the at least one processor, cause the second apparatus at least to:

configure at least one configuration parameter for a hybrid automatic repeat request process;

and send the at least one configuration parameter to at least one terminal device, wherein the at least one configuration parameter indicates to the at least one terminal device a condition under which the at least one terminal device skips at least one retransmission of a data packet in the hybrid automatic repeat request process, wherein the condition is based, at least partially, on:

a timer, wherein the timer is started at a first transmission of the data packet performed in the hybrid automatic repeat request process, and a comparison of a time to a reference, wherein the time comprises a time between a reception of an initial uplink transmission grant for transmitting the data packet in the hybrid automatic repeat request process and a reception of a retransmission grant for retransmitting the data packet in the hybrid automatic repeat request process.

17. The second apparatus according to claim 16, wherein the at least one configuration parameter indicates to the at least one terminal device a condition under which the at least one terminal device changes at least one transmission configuration of a data radio bearer for transmission of at least one subsequent data packet.

18. The second apparatus according to claim 17, wherein the at least one configuration parameter indicates to the at least one terminal device not to change the at least one transmission configuration of the data radio bearer for the transmission of the at least one subsequent data packet based, at least partially, on a determination that the retransmission of the data packet indicated in the retransmission grant is performed or to be performed.

* * * * *